(12) United States Patent
Haider et al.

(10) Patent No.: US 9,317,089 B2
(45) Date of Patent: Apr. 19, 2016

(54) MESH PERFORMANCE IMPROVEMENT USING DUAL VOLTAGE DATA TRANSFER

(71) Applicants: Nazar S. Haider, Fremont, CA (US); Donald C. Soltis, Jr., Windsor, CO (US)

(72) Inventors: Nazar S. Haider, Fremont, CA (US); Donald C. Soltis, Jr., Windsor, CO (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 14/125,747

(22) PCT Filed: Oct. 28, 2013

(86) PCT No.: PCT/US2013/067020
§ 371 (c)(1),
(2) Date: Dec. 12, 2013

(87) PCT Pub. No.: WO2015/065310
PCT Pub. Date: May 7, 2015

(65) Prior Publication Data
US 2015/0169017 A1 Jun. 18, 2015

(51) Int. Cl.
*G06F 1/32* (2006.01)
*G06F 1/26* (2006.01)
*G06F 11/16* (2006.01)
*G05F 1/10* (2006.01)
*G06F 13/42* (2006.01)

(52) U.S. Cl.
CPC .. *G06F 1/26* (2013.01); *G05F 1/10* (2013.01); *G06F 11/16* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 2006/0143361 A1* | 6/2006 | Kottapalli | G06F 9/52 711/100 |
| 2008/0168318 A1 | 7/2008 | DeMent et al. | |
| 2009/0089543 A1 | 4/2009 | Gunther et al. | |
| 2009/0287978 A1* | 11/2009 | Tune | H04L 1/0001 714/752 |
| 2010/0264975 A1* | 10/2010 | Scott | H03K 19/018521 327/333 |
| 2011/0296216 A1 | 12/2011 | Looi et al. | |
| 2013/0007046 A1 | 1/2013 | Baum et al. | |
| 2013/0219196 A1 | 8/2013 | Finkelstein et al. | |
| 2014/0125381 A1* | 5/2014 | Schreiber | G06F 17/5045 326/93 |

FOREIGN PATENT DOCUMENTS

JP   2013-527546 A   6/2013

OTHER PUBLICATIONS

International Search Report and Written Opinion received for PCT Patent Application No. PCT/US2013/067020, mailed on Jul. 24, 2014, 11 Pages.

* cited by examiner

*Primary Examiner* — Paul Yanchus, III
(74) *Attorney, Agent, or Firm* — Alpine Technology Law Group LLC (57) ABSTRACT

Methods and apparatus relating to techniques for mesh performance improvement using dual voltage data transfer are described. In one embodiment, a first plurality of signal paths are operated at a higher voltage level than a second plurality of signal paths. The first plurality of signal paths comprises Resistor-Capacitor (RC) dominated signal paths that move signals between any two system tiles. Other embodiments are also disclosed.

23 Claims, 10 Drawing Sheets

MESH PERFORMANCE IMPROVEMENT USING DUAL VOLTAGE DATA TRANSFER

FIELD

The present disclosure generally relates to the field of electronics. More particularly, an embodiment relates to techniques for mesh performance improvement using dual voltage data transfer.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

To increase performance, computers are migrating to multiple core processors and in some cases to many core systems. Moreover, there is a rapid growth in the number of cores as well as IO (Input/Output or I/O) channels in each new generation of computers. Computers may also continually add on more cores and channels of high speed IO circuits to deliver highly connected systems with multiple CPUs (Central Processing Units). e.g., on a single motherboard. The addition of cores means a better and faster mechanism for communication between the cores and the Last Level Cache (LLC). However, one key constraint of power for computers (e.g., servers) is for their total power envelope to stay constant. Hence, power consumption is a critical vector for the success of new computer products (including servers) and it is critically important to control and reduce their power consumption.

To this end, some embodiments improve mesh architecture performance using dual voltage data transfer. While some embodiments generally discuss improving the performance of a mesh architecture, embodiments are not limited to mesh architecture and may also be used to improve ring architecture performance. In an embodiment, the RC (Resistor-Capacitor) dominated signal paths are moved to a higher operating voltage than the other paths. The dominated signal paths (which may be referred to herein as "mesh paths") may include signal paths that move data and control signals between two tiles. As discussed herein, a tile includes a processor core and/or an LLC. In some embodiments, a tile may also include a Cache Home Agent (CHA) which interacts with processor core(s), LLC, and other tiles via the mesh. The "other paths" may include paths that move signals between stages by traversing buffers. In some embodiments, signal paths that traverse tiles are moved to a higher voltage level since they have to travel much greater distances relatively, and hence have a larger RC component. Paths within the tile are shorter and can be considered as "logical paths". Also, instead of moving the full flop to flop path, only parts that are combinatorial (such as signal repeaters) are moved to the higher operating voltage in one embodiment.

Figure 1:
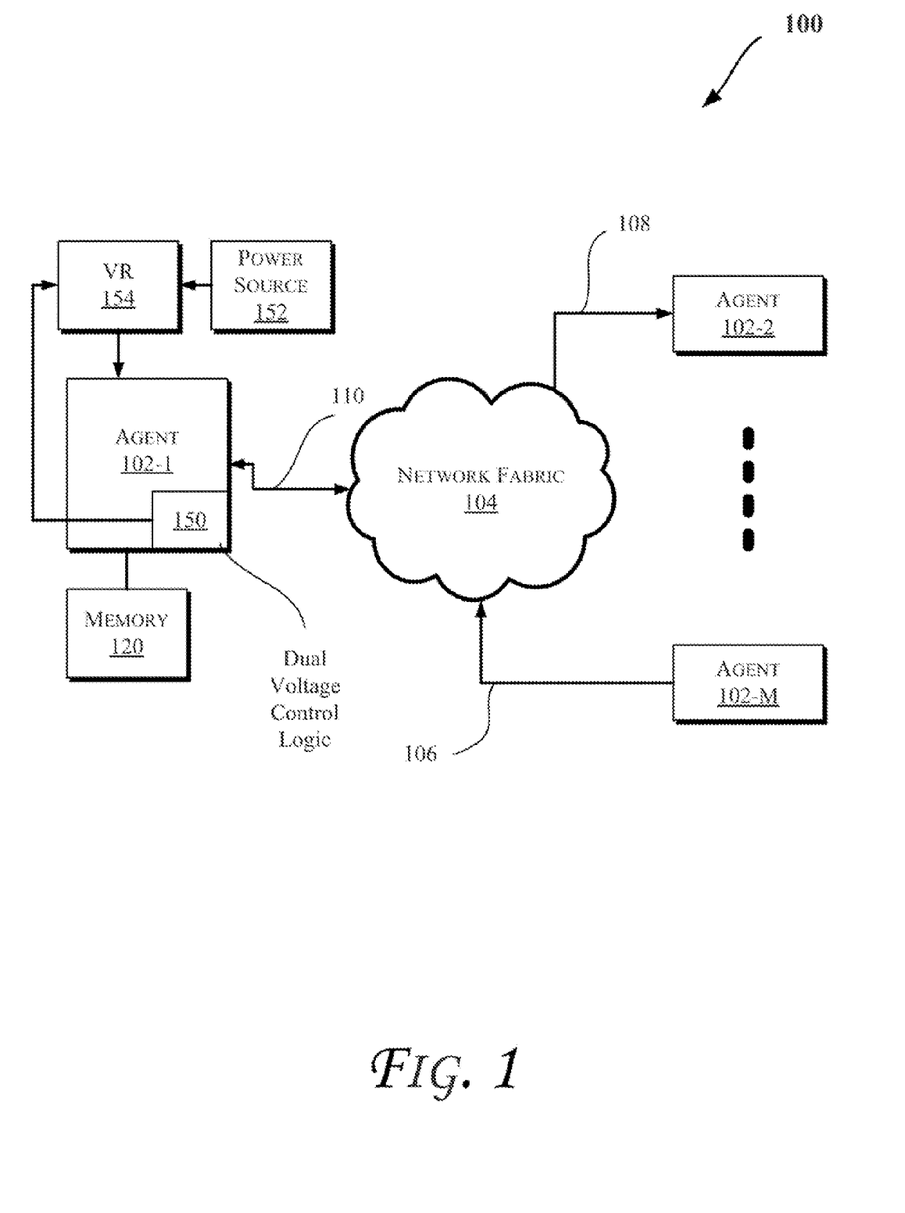
FIG. 1 illustrates a block diagram of an embodiment of a computing systems, which can be utilized to implement various embodiments discussed herein.

Various computing systems may be used to implement embodiments, discussed herein, such as the systems discussed with reference to FIGS. 1-2 and 5-7. More particularly, FIG. 1 illustrates a block diagram of a computing system 100, according to an embodiment. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 5-7.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network (which may be configured as a ring in an embodiment). Each link may include one or more lanes. For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents. Generally, requesting/caching agents send request(s) to a home node/agent for access to a memory address with which a corresponding "home agent" is associated. Further, in an embodiment, one or more of the agents 102 (only one shown for agent 102-1) may have access to a memory (which may be dedicated to the agent or shared with other agents) such as memory 120. In some embodiments, each (or at least one) of the agents 102 may be coupled to the memory 120 that is either on the same die as the agent or otherwise accessible by the agent. Also, as shown in FIG. 1, agents 102 include dual voltage control logic 150 to control the voltage level provided to different groups of signal paths in agent 102, as will be further discussed herein, e.g., with reference to FIGS. 2-7.

The system 100 may also include a power source 152 (e.g., a direct current (DC) power source or an alternating current (AC) power source) to provide power to agent 102. In some embodiments, the power source 152 may include one or more battery packs and/or power supplies. The power source 152 may be coupled to components of system 100 through a voltage regulator (VR) 154 (which may be a single or multiple phase VR). In an embodiment, the VR 152 may be a FIVR (Fully Integrated Voltage Regulator). Moreover, even though FIG. 1 illustrates one power source 152 and one voltage regulator 154, additional power sources and/or voltage regulators may be utilized. Also, the voltage regulator(s) 154 may be coupled to the agent 102 via a single power plane (e.g., supplying power to all processor cores of the agent 102) or multiple power planes (e.g., where each power plane may supply power to a different core or group of cores). Power source 152 may be capable of driving variable voltage or have different power drive configurations.

Additionally, while FIG. 1 illustrates the power source 152 and the voltage regulator 154 as separate components, the power source and the voltage regulator may be integrated and/or incorporated into other components of system 100. For example, all or portions of the VR 154 may be incorporated into the power source 152. Furthermore, as shown in FIG. 1, the power source 152 and/or the voltage regulator 154 may communicate with the control logic 150 and report their power specification. Additionally, various components of a computing system (such as one or more components of systems of FIGS. 2, 5, 6, or may be coupled to power source 152 and VR 154).

Also, logic 150 may be coupled to one or more sensors (not shown, where the sensor(s) may be located proximate to components of agent 102 (or components of computing systems discussed herein such as those discussed with reference to other figures including FIGS. 5-7, for example) to sense variations in various factors affecting power/thermal behavior of the system, such as temperature, operating frequency, operating voltage, operating current, dynamic capacitance, power consumption, inter-core communication activity, etc.). Moreover, to implement dual voltage control, two different power supplies may be used (e.g., with individual sense points (e.g., per sensor input) and control) in some embodiments.

Figure 2:
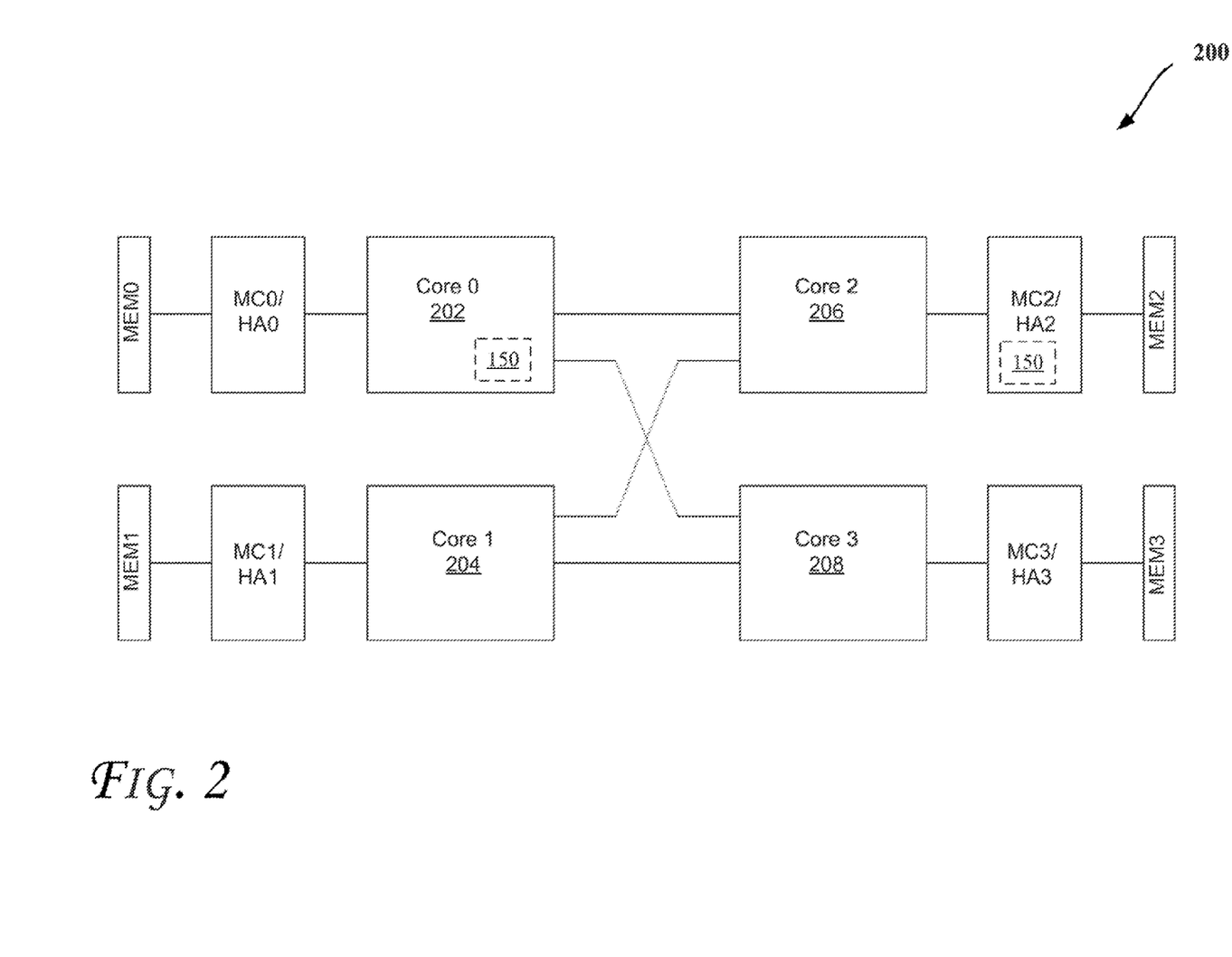
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor. Also, various agents in the system 200 can communicate via logic 150. Even though logic 150 is only shown in items 202 and MC2/HA2, logic 150 may be provided in other agents of system 200. Further, more or less logic blocks can be present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 912 of FIG. 9). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3A:
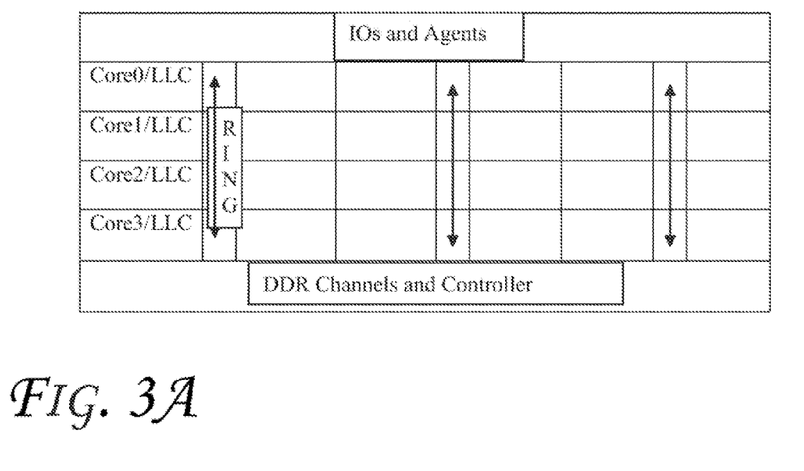
FIG. 3A shows a block diagram of a ring architecture, which can be utilized to implement one or more embodiments discussed herein.
Figure 3B:
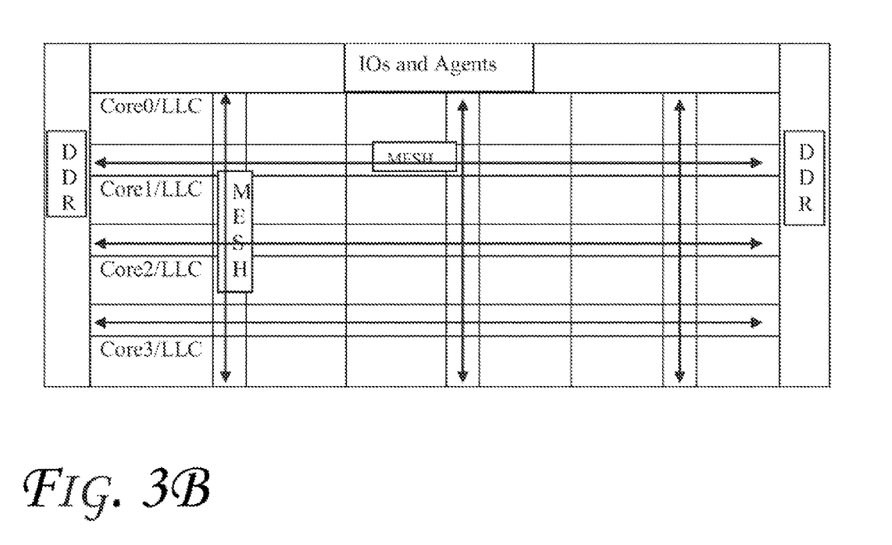
FIG. 3B shows a block diagram of a mesh architecture, which can be utilized to implement one or more embodiments discussed herein.

In some computing systems (e.g., servers), a ring architecture is used as a mechanism for communication between cores, cache, and the rest of the uncore. Generally, a typical server floor plan includes a die with an array of core/LLC tiles surrounded by IO circuits and their corresponding agents (such as shown in FIG. 3A). In the next generation of computer servers, since the number of cores have increased significantly from its predecessor designs, the ring architecture needs to be replaced to enable higher bandwidth of data and meet improved latency requirements. The new design is referred to as a mesh architecture. Mesh architecture is aimed at improving the overall bandwidth required by the cores and is capable of servicing more channels of DDR (Double Data Rate) memory. As the name implies, the mesh architecture can be thought of as multiple horizontal and vertical rings (as shown in FIG. 3B). This improvement of bandwidth and latency permits the mesh architecture to operate at a relatively lower frequency than its predecessor ring architecture and deliver equal or better performance.

FIGS. 3A and 3B show block diagrams of a ring architecture and a mesh architecture, respectively, that may be used in various embodiments. A server floor plan with a ring architecture is shown in FIG. 3A, where the die contains an array of core/LLC tiles surrounded by IO circuits and their corresponding agents. FIG. 3B illustrates a floor plan with a mesh architecture that could potentially provide a higher number of DDR channels than a ring architecture.

Referring to FIG. 3A, communication to other cores can take place vertically through specialized vertical ring like structures. As the number of cores increase, there is a need to improve the communication between cores and also improve the overall bandwidth to the memory through increased number of DDR channels. FIG. 3B shows a modified architecture where a mesh architecture is used to accomplish this goal.

Referring to FIG. 3B, communication between cores, LLC, and memory can take place over both vertical and horizontal mesh links, reducing average latency and improving bandwidth to the DDR channels as well. A mesh architecture or a ring architecture consists mainly of logic blocks and LLC cache circuits, and also of mesh or ring signals that carry data and control signals across the chip. Thus, the overall performance is determined by the frequency of operation of the mesh logic, LLC, and ring signals. A slowdown in any of these items will result in degradation of performance or increase of power consumption due to increased voltage required to compensate for the drop in frequency.

Moreover, the height and width of the core/LLC tile determines the number of clock cycles required to move data across the mesh architecture. For a given height/width, minimizing the stages between one tile to the next directly improves/reduces the latency. Increasing the frequency of the mesh on the other hand can improve the bandwidth of data movement but can also degrade the power performance. Balancing these factors may be a critical aspect of mesh design. Another important aspect of the mesh or ring architecture design is that data moved between stages can go through many buffers and since the travel distance is large from a timing perspective, these paths typically encounter fairly large RC (Resistor-Capacitor) delays. As the voltage on these paths is increased, these paths may demonstrate saturation of speed-up and become limited by the RC time constant of the lines carrying the signals. This is in part because at a lower voltage level transistors form a larger portion of the total path delay, but as the voltage level is increased the percentage contribution by transistors falls and RC time constant becomes dominant. This behavior is markedly different from logical paths (e.g., which may be transistor dominated) that are found in the logical portions of the mesh. This effect is shown in FIG. 4A.

Figure 4A:
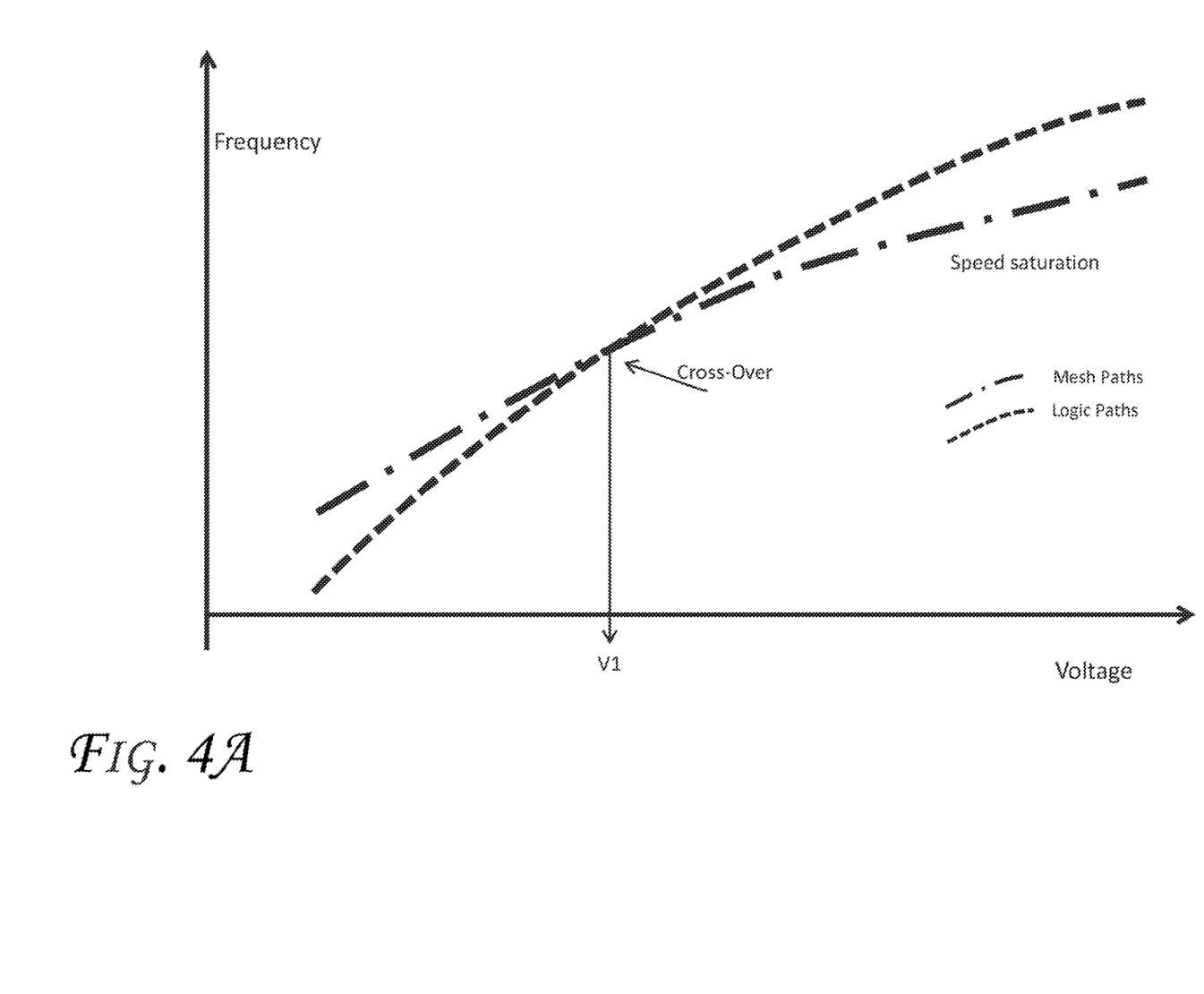
FIG. 4A illustrates a graph of sample frequency vs. voltage values for RC dominated paths and logical paths, according to an embodiment.

More specifically, FIG. 4A illustrates a graph of sample frequency vs. voltage values for RC dominated paths and logical paths, according to an embodiment. This figure shows a comparison of transistor and RC dominated paths found in the mesh design. As can be seen, increase of voltage does not help in delivering higher frequency of the mesh/ring due to the saturation effect explained earlier. Also, any increase over cross-over point delivers lower frequency but comes at considerable power consumption penalty for the mesh. As an example, if the target frequency of an operation is past the cross-over point (V1), an increase of voltage increases the mesh frequency at a slower slope resulting in considerable power consumption increase, since the whole mesh now has to run at this voltage. The alternative to this is the addition of stages (flop/latch) per tile to enable higher frequency at the expense of latency.

Figure 4B:
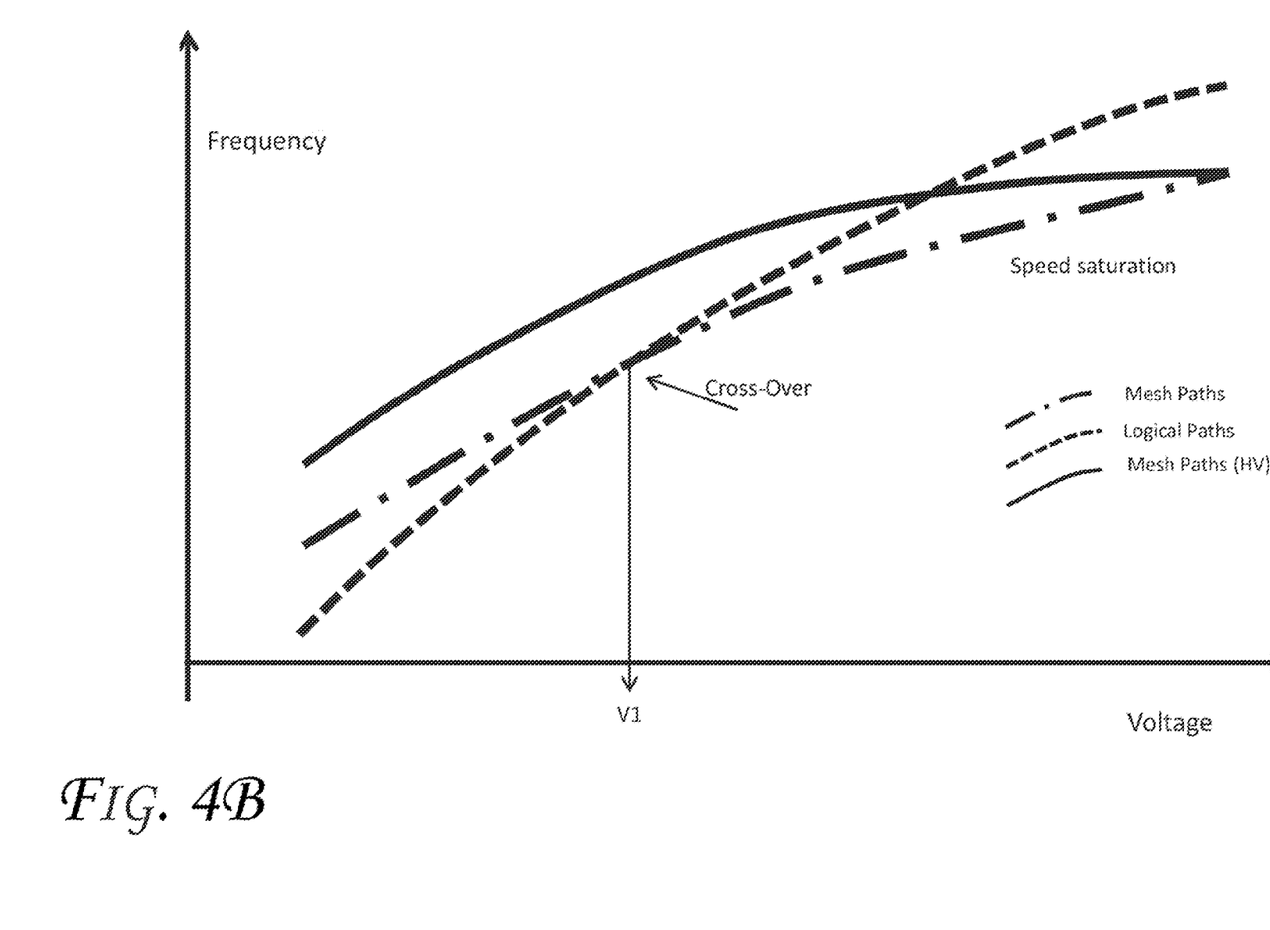
FIG. 4B illustrates a graph of sample frequency vs. voltage values for RC dominated paths, logical paths, and impact of moving the RC dominated paths to higher voltage level(s), according to some embodiments.

To this end, some embodiments resolve the above-mentioned penalties in power consumption or latency in both horizontal and vertical mesh design, and are thus also suitable for designs employing ring architecture. More specifically, FIG. 4B illustrates a graph of sample frequency vs. voltage values for RC dominated paths, logical paths, and impact of moving the RC dominated paths to higher voltage (HV) level(s), according to some embodiments. One embodiment involves moving the RC dominated paths of the ring/mesh (e.g., paths that move data and control between two tiles) to a higher operating voltage. Also, instead of moving the full flop to flop path, only the parts that are combinatorial are moved (e.g., signal repeaters). This reduces the clock penalty that may be required if even the state elements were moved to a different power supply. Although this embodiment can be implemented with and without FIVR (Fully Integrated Voltage Regulator), having a FIVR in the design helps in generating yet another power supply if needed. In an embodiment, VccIO (IO supply voltage for IO circuits, e.g., ~1.0V) is used for the RC dominated paths and a FIVR is used for the remaining mesh structures/paths. Since the mesh may provide a variable voltage plane, considerable power savings may be achieved with this solution.

Table 1 below shows the comparison of performance/latency/frequency of two solutions vs. an embodiment. "CLM" refers to the Caching/home agent, LLC, and mesh unit. The first solution (Solution I) runs the mesh/ring at the best frequency while minimizing latency impact by eliminating flop/latch stages between two ring stops/tiles. The second solution (Solution II) adds additional stages between ring stops and pushes the frequency higher to buy back some latency impact. Finally, the third solution still uses no latch/flop stages between ring stops but moves the mesh/ring signals between ring stops to a higher voltage (e.g., higher than the ring stop itself). For example, in some embodiments, the mesh includes the LLC, caching/home agent, and mesh wires, which communicate from one core tile to the next. In an embodiment, only the mesh wires are moved to the higher voltage, i.e., communicate between tiles (CHA of one tile talking to CHA of a different tile). As can be seen, this new solution provides the best latency at a lower frequency. In terms of power, the last solution saves power by running the overall mesh at lower voltage (since the frequency is lower) and RC dominated paths are eliminated. It also eliminates the need to push the frequency higher as is required in the second solution.

TABLE 1

| | Nominal CLM Freq | Turbo CLM Freq | Gap to Target Latency | Comments |
|---|---|---|---|---|
| Solution I | 1.9 GHz | 2.0 GHz | 5% | No Latch/Flop between ring stops |
| Solution II | 2.1 GHz | 2.4 GHz | 2.5% | Additional stage between ring stops |
| New Solution | 2.0 GHz | 2.2 GHz | 0% | Mesh/Ring repeaters at higher voltage |

Figure 4C:
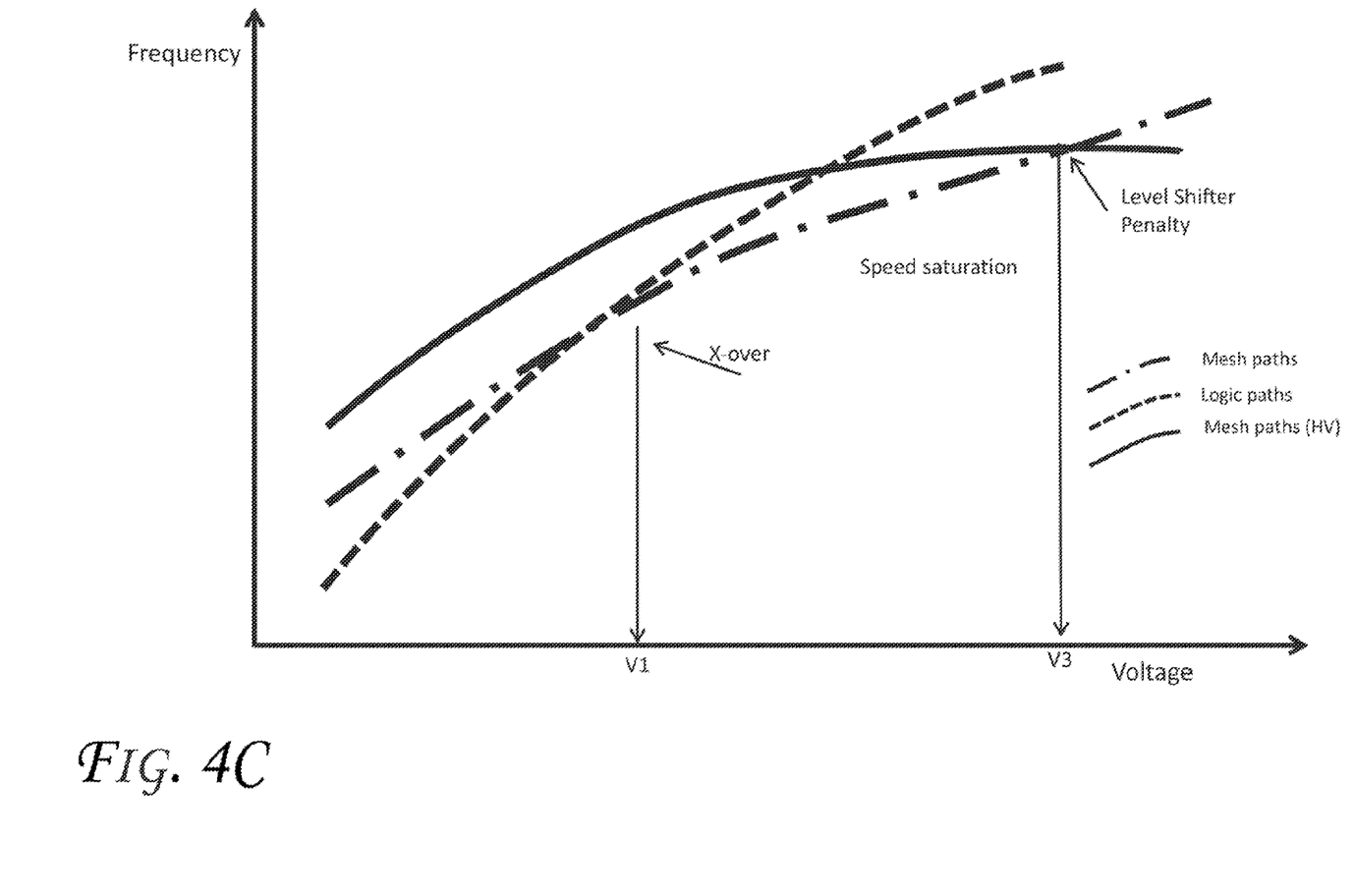
FIG. 4C illustrates a graph of sample frequency vs. voltage values when adding level shifters, according to an embodiment

FIG. 4C shows a graph of sample frequency vs. voltage values for an additional effect due to added level shifters, according to an embodiment. Since the design of the mesh/ring utilizes dual voltages, level shifter(s) is added on the RC dominated combinational paths in some embodiments. The level shifter adds additional delay. For example, whenever a signal traverses two different voltage planes in a CPU, a level shifter circuit may be utilized. This circuit permits a logic transfer between voltage planes without jeopardizing noise immunity. Voltage point V3 in FIG. 4C shows this effect. For example, the logic paths operate at voltage V_lg and the mesh/ring (RC dominated) operates at V_hv, where V_hv>V_lg. Assume that V_lg is a variable voltage plane to support turbo or variable frequency operating point for the mesh/ring. When V_lg~=V_hv (V3), the speed behavior reverses as shown in FIG. 4C at point V3. This is because dual voltage mesh/ring incurs additional level shifter delay while a single voltage mesh/ring does not. However, depending on the delay of the level shifter or that V_lg may be used to be higher than V_hv (e.g., during some turbo modes), it is possible that this delay needs to be eliminated.

Figure 4D:
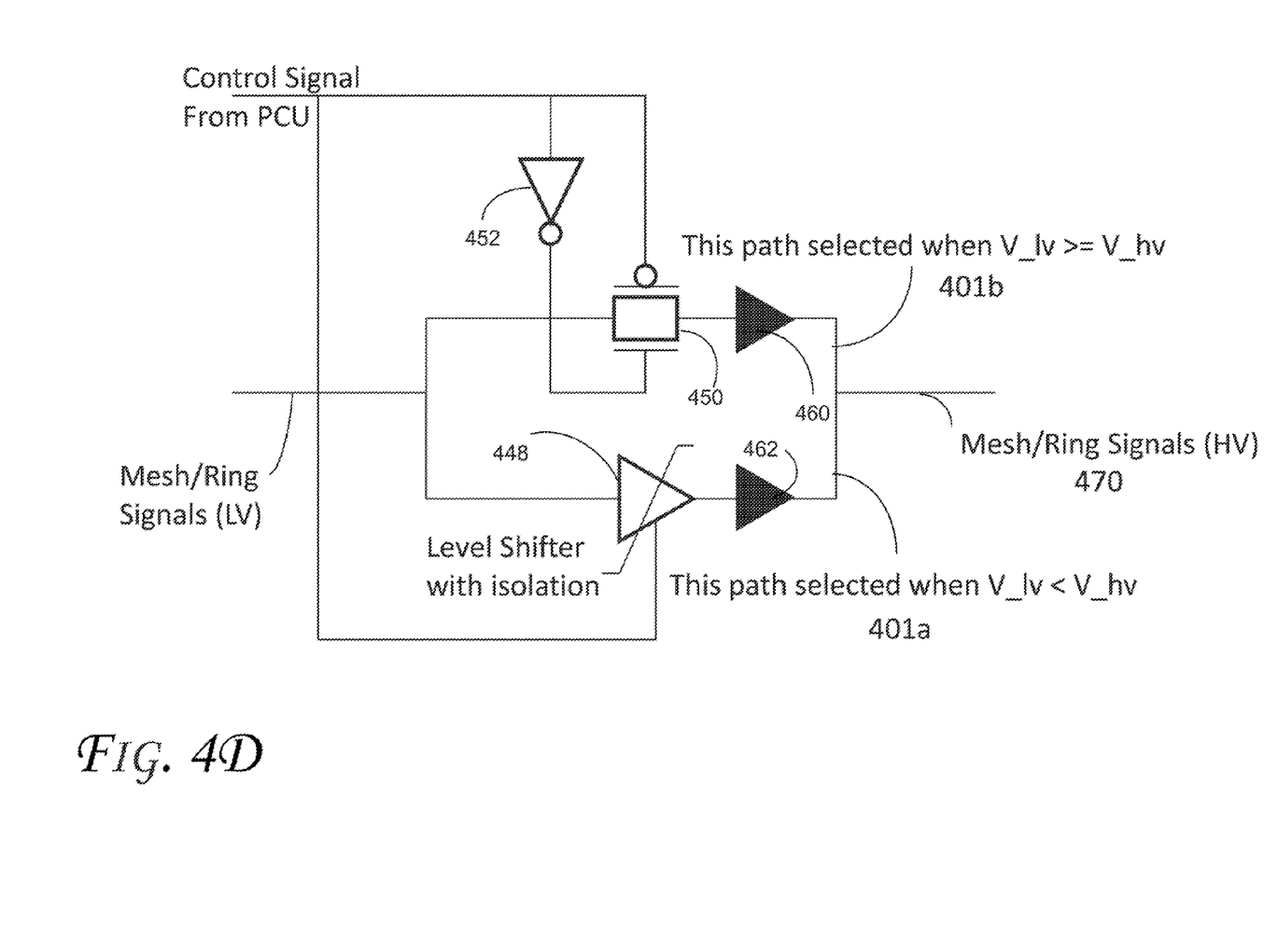
FIG. 4D illustrates a block diagram of a circuit to address effects resulting from addition of level shifters, according to an embodiment.

To do this, the circuit of FIG. 4D may be used, in accordance with an embodiment. In this circuit, a control signal (e.g., generated by a Power Control Unit (PCU)) can be used to "bypass" the level shifter 448) if V_lg is being raised higher than V_hv (e.g., by controlling logic 450 via inverter 452). Using this technique eliminates any performance loss at these higher voltages as well. Furthermore, output of the logic 450 and level shifter 448 are driven as HV signal via drivers 460/462.

As illustrated in FIG. 4D, during one mode of operation, where logical path voltage (V_lv) is less than the voltage of RC paths (V_hv), the level shifter 448 is utilized to drive mesh signals (HV) on output 470 through path 401a. In one embodiment, level shifter 448 allows for logic transfer between voltage planes without jeopardizing noise immunity. In another scenario, a PCU sends a bypass signal to bypass level shifter 448 in response to V_lv being raised above V_hv. Here, control logic (such as logic 150) and inverter 452 are to cause utilization of path 401a. As a result, level shifter 448 is bypassed and the mesh/ring signals (HV) are driven by driver 460 on output 470 through path 401b. Hence, a dual path is provided by the circuit of FIG. 4D to achieve optimal power and performance balance at different relative operating voltages.

Figure 5:
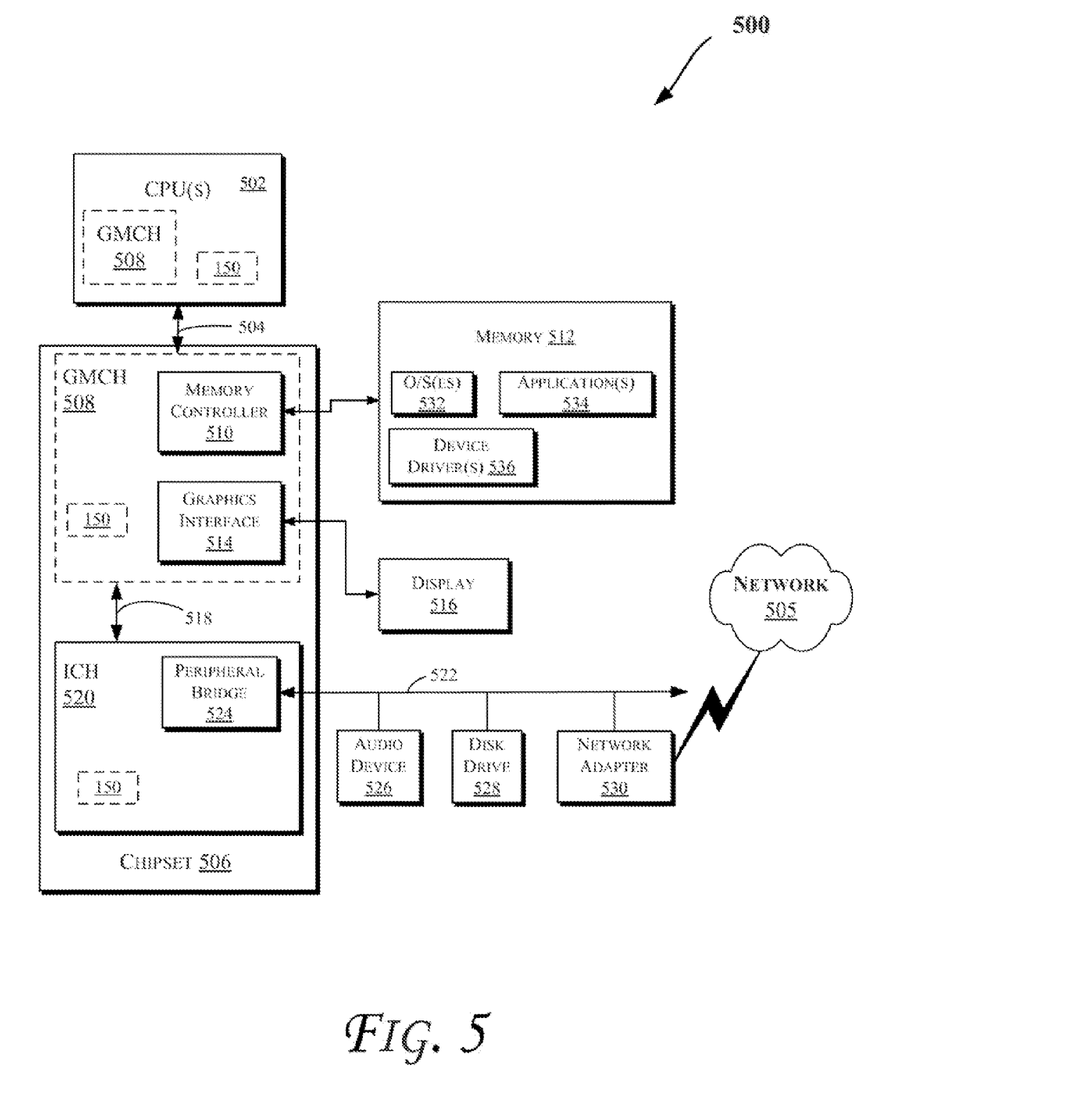
FIG. 5 illustrates a block diagram of an embodiment of a computing system, which can be utilized to implement one or more embodiments discussed herein.

FIG. 5 illustrates a block diagram of an embodiment of a computing system 500. One or more of the agents 102 of FIG. 1 may comprise one or more components of the computing system 500. Also, various components of the system 500 may include logic 150 as illustrated in FIG. 5. However, logic 150 may be provided in locations throughout the system 500, including or excluding those illustrated. The computing system 500 may include one or more central processing unit(s) (CPUs) 502 (which may be collectively referred to herein as "processors 502" or more generically "processor 502") coupled to an interconnection network (or bus) 504. The operations discussed with reference to FIGS. 1-4 may be performed by one or more components of the system 500.

The processors 502 may be any type of processor such as a general purpose processor, a network processor (which may process data communicated over a computer network 505), etc. (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than prefetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) may be located in various locations (e.g., inside other components to the computing systems discussed herein, including systems of FIG. 1, 2, 5, 6, or 7).

A chipset 506 may additionally be coupled to the interconnection network 504. Further, the chipset 506 may include a graphics memory control hub (GMCH) 508. The GMCH 508 may include a memory controller 510 that is coupled to a memory 512. The memory 512 may store data, e.g., including sequences of instructions that are executed by the processor 502, or any other device in communication with components of the computing system 500. Also, in one embodiment, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The GMCH 508 may further include a graphics interface 514 coupled to a display device 516 (e.g., via a graphics accelerator in an embodiment). In one embodiment, the graphics interface 514 may be coupled to the display device 516 via an Accelerated Graphics Port (AGP) or Peripheral Component Interconnect (PCI) (or PCI express (PCIe) interface). In an embodiment, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the GMCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a Peripheral Component Interconnect (PCI) bridge that may be compliant with the PCIe specification, a universal serial bus (USB) controller, etc. The bridge 524 may provide a data path between the processor 502 and peripheral devices. Other types of topologies may be utilized. Also, multiple buses may be coupled to the ICH 520, e.g., through multiple bridges or controllers. Further, the bus 522 may comprise other types and configurations of bus systems. Moreover, other peripherals coupled to the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506. Also, various components (such as the network adapter 530) may be coupled to the GMCH 508 in some embodiments. In addition, the processor 502 and the GMCH 508 may be combined to form a single chip. In an embodiment, the memory controller 510 may be provided in one or more of the CPUs 502. Further, in an embodiment, GMCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include one or more of the following in an embodiment: an operating system (O/S) 532, application 534, and/or device driver 536. The memory 512 may also include regions dedicated to Memory Mapped I/O (MMIO) operations. Programs and/or data stored in the memory 512 may be swapped into the disk drive 528 as part of memory management operations. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter 530 specific commands to provide a communication interface between the O/S 532 and the network adapter 530, or other I/O devices coupled to the system 500. e.g., via the chipset 506.

In an embodiment, the O/S 532 may include a network protocol stack A protocol stack generally refers to a set of procedures or programs that may be executed to process packets sent over a network 505, where the packets may conform to a specified protocol. For example, TCP/IP (Transport Control Protocol/Internet Protocol) packets may be processed using a TCP/IP stack. The device driver 536 may indicate the buffers in the memory 512 that are to be processed, e.g., via the protocol stack.

The network 505 may include any type of computer network. The network adapter 530 may further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 may include a network adapter controller, which may include logic (such as one or more programmable processors) to perform adapter related operations. In an embodiment, the adapter controller may be a MAC (media access control) component. The network adapter 530 may further include a memory, such as any type of volatile/nonvolatile memory (e.g., including one or more cache(s) and/or other memory types discussed with reference to memory 512).

Figure 6:
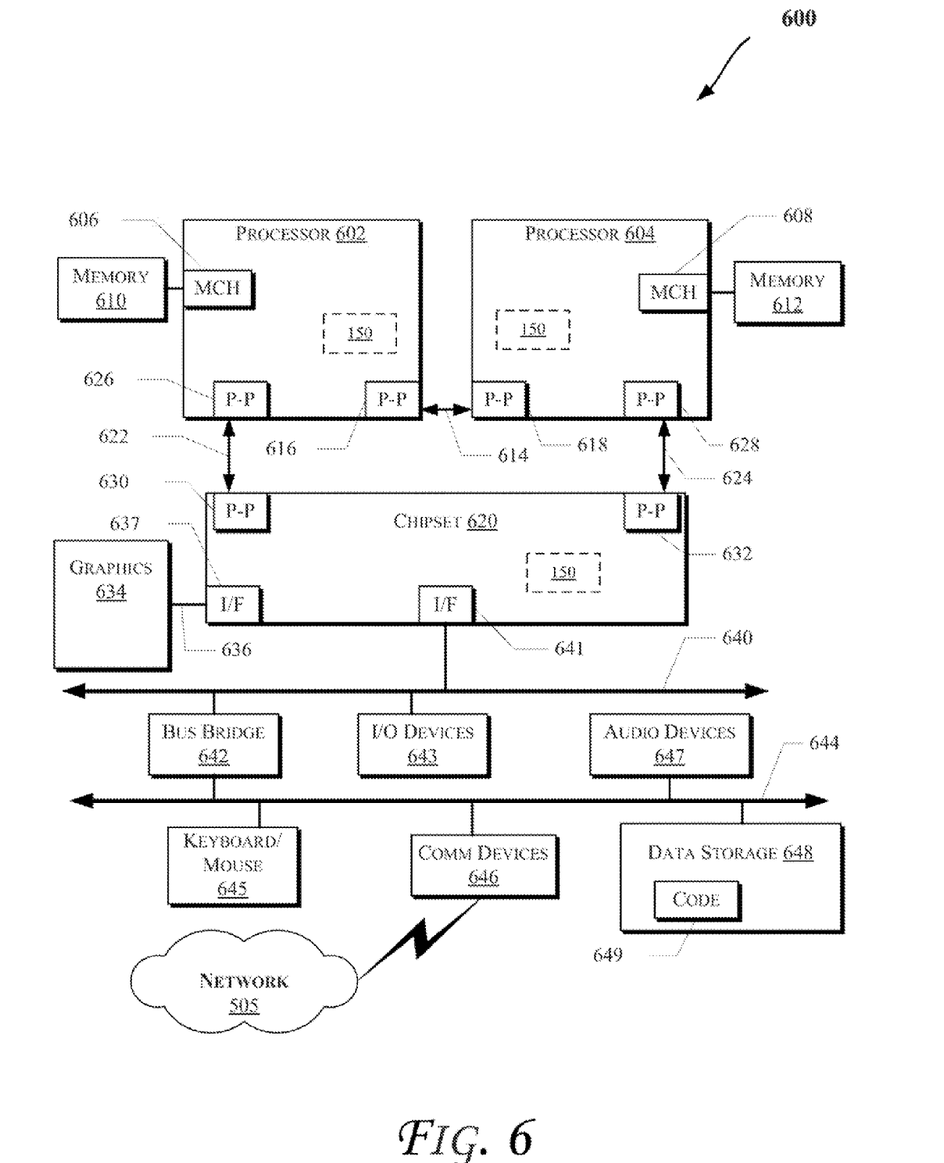
FIG. 6 illustrates a block diagram of an embodiment of a computing system, which can be utilized to implement one or more embodiments discussed herein.

FIG. 6 illustrates a computing system 600 that is arranged in a point-to-point (PtP) configuration, according to an embodiment. In particular. FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local Memory Controller Hub (MCH) 606 and 608 to enable communication with memories 610 and 612. The memories 610 and/or 612 may store various data such as those discussed with reference to the memory 612 of FIG. 6. As shown in FIG. 6, the processors 602 and 604 (or other components of system 600 such as chipset 620, I/O devices 643, etc.) may also include one or more cache(s) such as those discussed with reference to FIGS. 1-5.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, logic 150 may be provided in one or more of the processors 602, 604 and/or chipset 620. Other embodiments, however, may exist in other circuits, logic units, or devices within the system 600 of FIG. 6. Furthermore, other embodiments may be distributed throughout several circuits, logic units, or devices illustrated in FIG. 6. For example, various components of the system 600 may include the logic 150 of FIG. 1. However, logic 150 may be provided in locations throughout the system 600, including or excluding those illustrated.

The chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 605), audio I/O device, and/or a data storage device 648. The data storage device 648 may store code 649 that may be executed by the processors 602 and/or 604.

Figure 7:
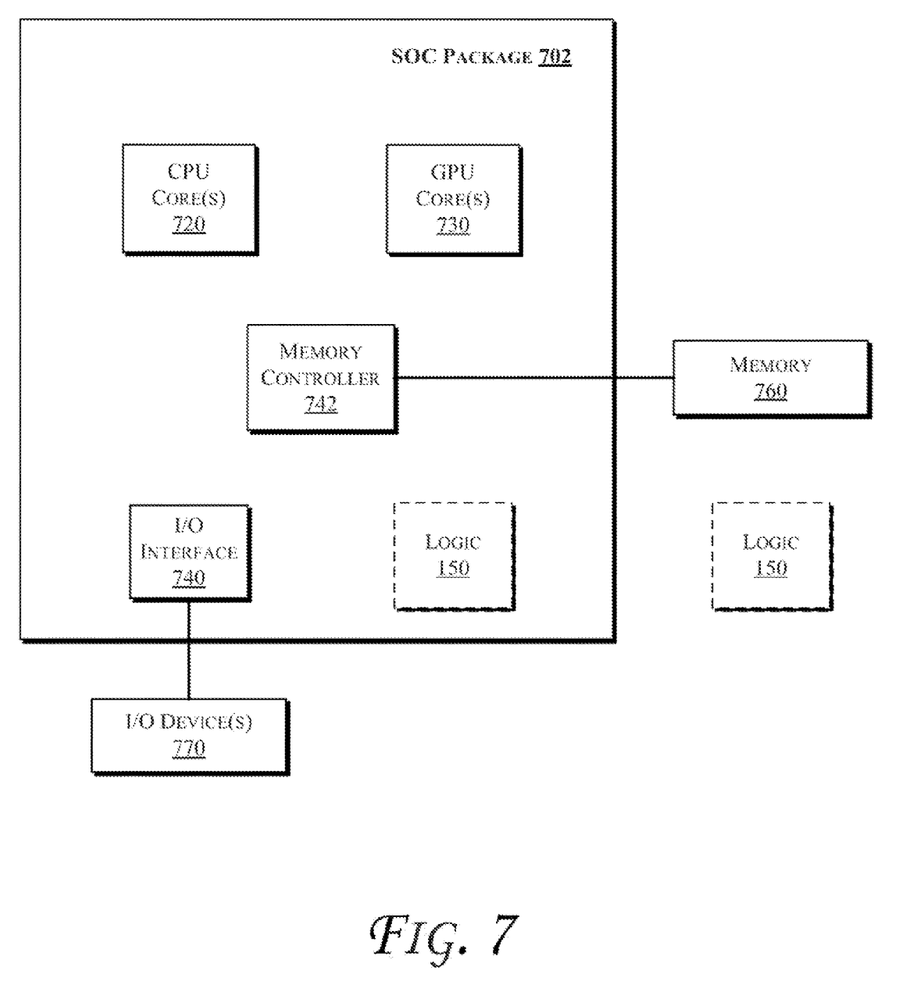
FIG. 7 illustrates a block diagram of an System On Chip (SOC) package in accordance with an embodiment.

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 150 in an embodiment. Alternatively, the logic 150 may be provided outside of the SOC package 702 (i.e., as a discrete logic).

The following examples pertain to further embodiments. Example 1 includes an apparatus comprising: a first tile including a first processor core and a first cache; a second tile including a second processor core and a second cache; logic to cause a first plurality of signal paths between the first tile and the second tile to operate at a higher voltage level than a second plurality of signal paths associated with the first and the second tile, wherein the first plurality of signal paths are to comprise Resistor-Capacitor (RC) dominated signal paths that are to move signals between the first and the second tiles. Example 2 includes the apparatus of example 1, wherein each tile is to at least comprise a processor core and a last level cache. Example 3 includes the apparatus of example 1, wherein the second plurality of signal paths is to comprise paths that move signals through one or more buffers. Example 4 includes the apparatus of example 1, wherein the signals to be moved by the RC dominated signal paths is to comprise data and control signals. Example 5 includes the apparatus of example 1, wherein the logic is to cause only a portion of the first plurality of signal paths that includes combinatorial logic to operate at the higher voltage level. Example 6 includes the apparatus of example 5, wherein the combinatorial portion is to comprise one or more signal repeaters. Example 7 includes the apparatus of example 1, wherein the logic is to cause a voltage regulator to provide the higher voltage level to the first plurality of signal paths than to the second plurality of signal paths. Example 8 includes the apparatus of example 7, wherein the voltage regulator is to comprise Fully Integrated Voltage Regulator (FIVR). Example 9 includes the apparatus of example 7, wherein the first plurality of signal paths is to be supplied by an input/output voltage supply and the second plurality of signal paths is to be supplied by a FIVR. Example 10 includes the apparatus of example 1, wherein a level shifter logic is to be bypassed in response to a signal indicative of a voltage of the second plurality of signal paths exceeding a voltage of the first plurality of signal paths. Example 11 includes the apparatus of example 1, wherein one or more of the logic, the first plurality of signal paths, or the second plurality of signal paths are on a same integrated circuit die.

Example 12 includes a method comprising: causing a first plurality of signal paths to operate at a higher voltage level than a second plurality of signal paths, wherein the first plurality of signal paths comprise Resistor-Capacitor (RC) dominated signal paths that move signals between any two system tiles. Example 13 includes the method of example 12, wherein each system tile comprises at least a processor core and a last level cache. Example 14 includes the method of example 12, wherein the second plurality of signal paths comprises paths that move signals through one or more buffers. Example 15 includes the method of example 12, wherein the signals moved by the RC dominated signal paths comprise data and control signals. Example 16 includes the method of example 12, further comprising causing only a portion of the first plurality of signal paths that includes combinatorial logic to operate at the higher voltage level. Example 17 includes the method of example 16, wherein the combinatorial portion comprises one or more signal repeaters. Example 18 includes the method of example 12, further comprising causing a voltage regulator to provide the higher voltage level to the first plurality of signal paths than to the second plurality of signal paths. Example 19 includes the method of example 12, further comprising bypassing a level shifter logic in response to a signal indicative of a voltage of the second plurality of signal paths exceeding a voltage of the first plurality of signal paths.

Example 20 includes a computer-readable medium comprising one or more instructions that when executed on a processor configure the processor to perform one or more operations of any of examples 12 to 19.

Example 21 includes a system comprising: a processor having one or more processor cores; a power supply couple to the processor; and logic, coupled to the power supply, to cause a first plurality of signal paths to operate at a higher voltage level than a second plurality of signal paths, wherein the first plurality of signal paths are to comprise Resistor-Capacitor (RC) dominated signal paths that move signals between any two system tiles. Example 22 includes the system of example 21, wherein each system tile is to at least comprise a processor core and a last level cache. Example 23 includes the system of example 21, wherein the second plurality of signal paths is to comprise paths that move signals through one or more buffers. Example 24 includes the system of example 21, wherein the signals to be moved by the RC dominated signal paths is to comprise data and control signals. Example 25 includes the system of example 21, wherein the logic is to cause only a portion of the first plurality of signal paths that includes combinatorial logic to operate at the higher voltage level.

Example 26 includes an apparatus comprising: a plurality of tiles coupled to one or more data paths to move data between the plurality of tiles, each of the plurality of tiles to include a processor core and a cache, wherein the one or more data paths is to operate at a higher voltage than an internal path of a particular tile of the plurality of tiles in a first mode, and wherein the internal path of the particular tile is to operate at a higher voltage than the one or more data paths in a second mode; and control logic coupled to the particular tile to drive signals on the one or more data paths through a level shifter in the first mode and to bypass the level shifter and drive signals on the one or more data paths in the second mode. Example 27 includes the apparatus of example 26, wherein each tile of the plurality of tiles is to comprise at least a processor core and a last level cache. Example 28 includes the apparatus of example 26, wherein at least one of the one or more data paths is to comprise paths that move signals through one or more buffers. Example 29 includes the apparatus of example 26, comprising logic to cause only a portion of the one or more paths that include combinatorial logic to operate at the higher voltage level.

Example 30 includes an apparatus comprising means to perform a method as set forth in any of examples 12 to 19.

Example 31 includes a computer-readable medium comprising one or more instructions that when executed on a processor configure the processor to perform one or more operations to: cause a first plurality of signal paths to operate at a higher voltage level than a second plurality of signal paths, wherein the first plurality of signal paths comprise Resistor-Capacitor (RC) dominated signal paths that move signals between any two system tiles. Example 32 includes the computer-readable medium of example 31, wherein each system tile comprises at least a processor core and a last level cache. Example 33 includes the computer-readable medium of example 31, wherein the second plurality of signal paths comprises paths that move signals through one or more buffers. Example 34 includes the computer-readable medium of example 31, wherein the signals moved by the RC dominated signal paths comprise data and control signals. Example 35 includes the computer-readable medium of example 31, further comprising one or more instructions that when executed on the processor configure the processor to perform one or more operations to cause only a portion of the first plurality of signal paths that includes combinatorial logic to operate at the higher voltage level. Example 36 includes the computer-readable medium of example 35, wherein the combinatorial portion comprises one or more signal repeaters. Example 37 includes the computer-readable medium of example 31, further comprising one or more instructions that when executed on the processor configure the processor to perform one or more operations to cause a voltage regulator to provide the higher voltage level to the first plurality of signal paths than to the second plurality of signal paths. Example 38 includes the computer-readable medium of example 31, further comprising one or more instructions that when executed on the processor configure the processor to perform one or more operations to cause bypassing of a level shifter logic in response to a signal indicative of a voltage of the second plurality of signal paths exceeding a voltage of the first plurality of signal paths.

In various embodiments, the operations discussed herein, e.g., with reference to FIGS. 1-7, may be implemented as hardware (e.g., circuitry), software, firmware, microcode, or combinations thereof, which may be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments. "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first tile including a first processor core and a first cache;
a second tile including a second processor core and a second cache;
logic to cause a first plurality of signal paths between the first tile and the second tile to operate at a higher voltage level than a second plurality of signal paths associated with the first tile and the second tile, wherein the first plurality of signal paths are to comprise Resistor-Capacitor (RC) dominated signal paths that are to move signals between the first and the second tiles, wherein the logic is to cause only a portion of the first plurality of signal paths that includes combinatorial logic to operate at the higher voltage level.

2. The apparatus of claim 1, wherein each tile is to at least comprise a processor core and a last level cache.

3. The apparatus of claim 1, wherein the second plurality of signal paths is to comprise paths that move signals through one or more buffers.

4. The apparatus of claim 1, wherein the signals to be moved by the RC dominated signal paths is to comprise data and control signals.

5. The apparatus of claim 1, wherein the combinatorial portion is to comprise one or more signal repeaters.

6. The apparatus of claim 1, wherein the logic is to cause a voltage regulator to provide the higher voltage level to the first plurality of signal paths than to the second plurality of signal paths.

7. The apparatus of claim 6, wherein the voltage regulator is to comprise Fully Integrated Voltage Regulator (FIVR).

8. The apparatus of claim 6, wherein the first plurality of signal paths is to be supplied by an input/output voltage supply and the second plurality of signal paths is to be supplied by a FIVR.

9. The apparatus of claim 1, wherein a level shifter logic is to be bypassed in response to a signal indicative of a voltage of the second plurality of signal paths exceeding a voltage of the first plurality of signal paths.

10. The apparatus of claim 1, wherein one or more of the logic, the first plurality of signal paths, or the second plurality of signal paths are on a same integrated circuit die.

11. A method comprising:
causing a first plurality of signal paths to operate at a higher voltage level than a second plurality of signal paths, wherein the first plurality of signal paths comprise Resistor-Capacitor (RC) dominated signal paths that move signals between any two system tiles; and
causing only a portion of the first plurality of signal paths that includes combinatorial logic to operate at the higher voltage level.

12. The method of claim 11, wherein each system tile comprises at least a processor core and a last level cache.

13. The method of claim 11, wherein the second plurality of signal paths comprises paths that move signals through one or more buffers.

14. The method of claim 11, wherein the signals moved by the RC dominated signal paths comprise data and control signals.

15. The method of claim 11, wherein the combinatorial portion comprises one or more signal repeaters.

16. The method of claim 11, further comprising causing a voltage regulator to provide the higher voltage level to the first plurality of signal paths than to the second plurality of signal paths.

17. The method of claim 11, further comprising bypassing a level shifter logic in response to a signal indicative of a voltage of the second plurality of signal paths exceeding a voltage of the first plurality of signal paths.

18. A system comprising:
a processor having one or more processor cores;
a power supply coupled to the processor; and
logic, coupled to the power supply, to cause a first plurality of signal paths to operate at a higher voltage level than a second plurality of signal paths,
wherein the first plurality of signal paths are to comprise Resistor-Capacitor (RC) dominated signal paths that move signals between any two system tiles, wherein the logic is to cause only a portion of the first plurality of signal paths that includes combinatorial logic to operate at the higher voltage level.

19. The system of claim 18, wherein each system tile is to at least comprise a processor core and a last level cache.

20. The system of claim 18, wherein the second plurality of signal paths is to comprise paths that move signals through one or more buffers.

21. An apparatus comprising:
a plurality of tiles coupled to one or more data paths to move data between the plurality of tiles, each of the plurality of tiles to include a processor core and a cache, wherein the one or more data paths is to operate at a higher voltage than an internal path of a particular tile of the plurality of tiles in a first mode, and wherein the internal path of the particular tile is to operate at a higher voltage than the one or more data paths in a second mode; and
control logic coupled to the particular tile to drive signals on the one or more data paths through a level shifter in the first mode and to bypass the level shifter and drive signals on the one or more data paths in the second mode, wherein the control logic is to cause only a portion of the one or more data paths that includes combinatorial logic to operate at the higher voltage level.

22. The apparatus of claim 21, wherein each tile of the plurality of tiles is to comprise at least a processor core and a last level cache.

23. The apparatus of claim 21, wherein at least one of the one or more data paths is to comprise paths that move signals through one or more buffers.

* * * * *